United States Patent

Pobst

[15] 3,690,029
[45] Sept. 12, 1972

[54] FISHING FLY

[72] Inventor: John R. Pobst, 1835 S. Walmont Dr., Jackson, Mich. 49203

[22] Filed: March 26, 1971

[21] Appl. No.: 128,256

Related U.S. Application Data

[63] Continuation-in-part of Ser. No. 757,319, Sept. 4, 1968, Pat. No. 3,605,317.

[52] U.S. Cl. ............43/42.25, 43/42.28, 43/42.37, 43/42.39, 43/42.4, 43/42.43
[51] Int. Cl. .............................................A01k 85/08
[58] Field of Search......43/42.25, 42.37, 42.38, 42.4, 43/42.43, 42.39, 42.28

[56] References Cited

UNITED STATES PATENTS

| | | | |
|---|---|---|---|
| 1,480,766 | 1/1924 | Kelly et al. | 43/42.25 |
| 1,635,644 | 7/1927 | Sloan | 43/42.25 |
| 2,164,807 | 7/1939 | Evans | 43/43.16 |
| 2,199,001 | 4/1940 | Khoenle | 43/42.28 |
| 2,938,295 | 5/1960 | Watson | 43/43.2 |
| 3,023,536 | 3/1962 | Williams | 43/43.2 |

*Primary Examiner*—Samuel Koren
*Assistant Examiner*—Daniel L. Leach
*Attorney*—Beaman & Beaman

[57] ABSTRACT

A fly fishing lure having a hook which includes a shank portion adjacent the eye and a sharp barbed end in substantial alignment with a projection of the aforementioned shank portion. Intermediate the eye and the sharp barbed end the hook shank includes portions offset downwardly from the eye and sharp end such that the majority of the weight of the hook and lure functions as a "keel" to orient the lure such that the barbed end is disposed upwardly. Fly material is disposed adjacent the eye, and additional fly material is mounted upon the arcuate hook portion contributing to the low center of gravity and "keel" action. As used in a dry fly fishing lure adapted to rest upon the water surface, the invention contemplates the use of two groups of fly material strands in angularly disposed relationship to each other to aid in the lure floatation. In a wet lure embodiment the inventive concept encompasses the use of an additional metallic weight, such as in the form of wound wire, upon the hook portion constituting the "keel" of the lure.

14 Claims, 8 Drawing Figures

PATENTED SEP 12 1972 3,690,029

INVENTOR
JOHN R. POBST
BY Beaman & Beaman
ATTORNEYS

FISHING FLY

CROSS-REFERENCES TO RELATED APPLICATION

This application is a continuation-in-part of my copending United States Pat. application entitled Weightless, Weedless Fishing Fly, Ser. No. 757,319, filed Sept. 4, 1968, now U.S. Pat. No. 3,605,317.

BACKGROUND OF THE INVENTION

The invention is directed to fishing lures of the type generically known as fly fishing lures wherein the weight of the fishing line is primarily used in the placement and casting of the lure, and the lure is intended to represent an insect or similar natural fish bait. Additionally, the fishing lures in accord with the invention may be generally classified as "snagless" due to the ability of the lure to minimize occurrences of snagging on brush and water obstacles.

In the aforementioned application a fly fishing lure of superior snagless characteristics is achieved by the utilization of a uniquely formed hook upon which the fly material is mounted in a novel manner. The snagless features of the aforementioned lure result from several factors, such as the substantial alignment of the hook barb with the hook eye, and the extension of fly material from adjacent the eye to the barbed end wherein the fly material protects the sharp end of the hook from snagging.

Additionally, the lure of the aforementioned invention employs a hook having shank portions offset with respect to the eye and barbed end such that the combination of the lightweight fly material and hook weight causes the center of gravity of the lure to lie well below the fly material wherein the hook functions as a "keel" and maintains the hook sharp end disposed upwardly, away from rocks and branches resting upon the river or lake bottom with which snagging is normally likely.

While it is desired in the fishing lure of the aforementioned application that no additional weight be placed upon the lure, it has been found that with certain types of lures, because of the type of fly material tied thereon, or because of the small size of the hook as compared with the fly material, that the "keel" action desired is adversely affected as the weight of the hook portions producing the "keel" function is not great enough to always offset the influences of the fly material.

Additionally, while the basic inventive concepts as presented in the aforementioned application are applicable to dry flies as well as wet flies, i.e., dry flies being supported upon the water surface, rather than entering the water as in the case of a wet fly, there is a tendency for dry flies not to maintain the desired vertical orientation under certain conditions and additional orientation means are desirable.

SUMMARY OF THE INVENTION

It is the object of the invention to produce a fly fishing lure of a relatively snagless construction wherein the hook configuration and location of lure center of gravity is such that the fly produces a "keel" action to achieve a predetermined orientation while within or upon the water, and wherein such "keeling" and orientation may be achieved in flies of small dimension, or in dry flies adapted to be supported upon the water surface.

In the practice of the invention the hook employed is identical to that disclosed in the previously identified application, and in the manufacture of fly fishing lures in accord with the instant invention fly material, either in the form of strands, foil, wire, densely wound hair, or the like, is mounted upon the hook portion adjacent the arcuate hook portion, and is thereby offset with respect to the eye and sharp end, and offset relative to the fly material mounted adjacent the eye. In this manner the additional fly material so mounted upon the hook shank adjacent the arcuate portion augments the "keel" action achieved by the hook employed with the lure.

As used with a dry fly adapted to be supported upon the water surface, the fly material added to the hook portion adjacent the arcuate portion may be in the form of flexible hair strands densely bound to the hook portion constituting the primary "keel", and such bound strands are permitted to freely extend in an upward direction adjacent the hook arcuate portion so as to function to support the lure in a vertical orientation since the free strand ends will be disposed at a higher vertical elevation than the bound strand portions due to the indentation of the lure into the water surface. Additionally, the dry fly utilizes hackles or fine hair strands adjacent the eye, preferably disposed in intersecting planes wherein the downwardly extending hackles intermingle and engage the water surface to aid in the floatation of the lure. Further, by incorporating strands or fine feathers of greater length than the majority of the strands mounted adjacent the arcuate hook portion, the low center of gravity of the lure permits the lure to "keel" or orient itself in a vertical manner as the lure falls through the air to aid in proper orientation of the lure as it engages the water surface.

As the "keel" action of the lure orients the hook sharp end upwardly, the hooking of the fish usually takes place in the upper jaw, which is desirable as it increases the likelihood of maintaining the fish upon the lure and landing the catch.

In small size lures, particularly of the wet type, wherein the weight of the fly material is greater, by ratio, as compared to the total weight of the lure as compared with larger size lures wherein larger hooks are employed, the addition of weight to those portions of the hook offset with respect to the eye and sharp end is desirable to emphasize the "keel" effect. Such weight may be effectively added to the hook by winding or otherwise attaching wire to offset regions of the hook shank, and a lead wire may be used for this purpose. The addition of such wire also permits the wire itself to be wound and covered by more natural appearing fly material such as strands or hairs.

BRIEF DESCRIPTION OF THE DRAWING

The aforementioned objects and advantages of the invention will be appreciated from the following description and accompanying drawings wherein.

DESCRIPTION OF THE PREFERRED EMBODIMENTS

Figure 8:
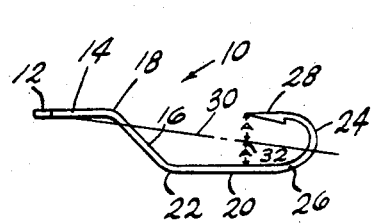
FIG. 8 is a side elevational view of the type of hook used with the fishing lure embodiments in accord with the invention.

In the disclosed embodiments of fly fishing lures incorporating the concepts of the present invention, the hook configuration used with the various embodiments is the same, except for overall size variations, and the configuration of this hook will be appreciated from FIG. 8.

The hook, generally designated at 10, is formed of a shank having portions as described below. The hook shank is formed of wire and includes an eye 12 formed at one end of the shank in the normal manner. The linear shank portion 14 adjacent the eye 12 extends in a horizontal direction, as illustrated, and a second shank portion 16 depends downwardly form the shank portion 14 at the junction 18. The second portion 16 is also of a linear configuration and extends away from the eye 12 toward the right, as will be appreciated. The third portion 20 of the hook shank extends to the right from the second hook portion at the junction 22 therewith, and the portion 20 is of a linear configuration substantially parallel to the shank portion 14, but spaced vertically below the projection of the shank portion 14. The third shank portion 20 serves as the support for the arcuate hook portion 24 which smoothly blends into the third portion at the junction 26. The hook portion 24 extends upwardly toward the longitudinal projection of the shank portion 14 and the sharp barb end 28 is disposed toward the eye 12 and is in substantial alignment with the projection of the shank portion 14.

It will be appreciated that a hook of the described shape and configuration has a center of gravity existing below a line interconnecting the eye 12 and the sharp point 28. The shank portion 14 can be considered to define an axis of the fly in that, particularly with a wet fly, the fly tends to pivot about the projection of the shank portion 14, but due to the low center of gravity of the hook, the vertical orientation of the hook is maintained by a "keel" action and the sharp end 28 will always be disposed above the shank portion 20 during use. The shank portions 16 and 20, and the arcuate hook portion 24, provide the mass that forms the "keel" action, and the hook configuration is such that over two-thirds of the weight of the hook is used to define the "keel" portion of the lure as defined by portions 16, 20 and 24. When the fly material is attached to the shank portions 14, 16 and 18, as will be described, it is desired that the weight of the lure below a line 30 drawn through the eye 12 and a point 32 located half way between the sharp end 28 and the shortest distance from the sharp end to the third portion 20, i.e., through the bight of the hook portion, constitute at least 50 percent of the total weight of the hook and thus at least 50 percent of the weight of the hook itself lies below line 30. Thus, such a weight distribution will place the center of gravity of the total fly well below the projection of the shank portion 14 and the lure will function in its desired "keel" manner.

Figure 1:
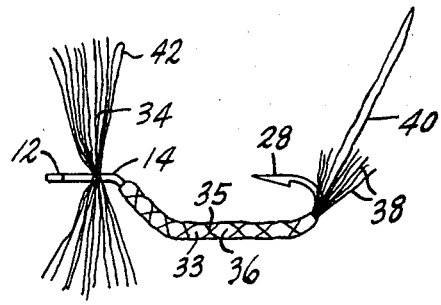
FIG. 1 is a side elevational view of a dry fly fishing lure constructed in accord with the invention having hackles disposed radially extending from the hook shank portion.

A basic dry fly fishing lure constructed in accord with the inventive concepts using the described hook is shown in FIG. 1. In a lure of this type, fine hair strands or hackles 34 are tied to the shank portion 14 adjacent the eye 12, and such hackles radially extend from the associated shank portion substantially vertically, as will be appreciated from FIG. 1. The hackles 34 are of considerable length, and those hackles or strands extending downwardly extend well below the projection of the hook shank portion 20. Additional fly material is tied to the shank portions 16 and 20, and in the disclosed embodiment such fly material takes the form of a plurality of flexible hairs or strands 33 which are tightly and densely wrapped by thread 35 to form a bundle or body 36 disposed about the portions 16 and 20 which adds significant weight to the hook at these portions. The "rear" portion of the body 36 extends around the junction 26 of the hook so as to be disposed upwardly toward the projection of the shank portion 14. This orientation is important in that strands 38, which are the free ends of strands 33, freely extend from the rear of the body 36 about the arcuate hook portion 24 and in a general upward direction, inclined to the horizontal. As will be appreciated from FIG. 1 the length of the strands 38 freely extending from the body 36 is substantial, and, preferably, several strands, or a small feather 40, also extends from the bundle 36 and is of significantly greater length than the free strands 38 and extends vertically upwardly a considerable distance above the projection of the shank portion 14. Also, a pair of small feathers 42 may be incorporated into the hackles 34 and may extend in an upward direction as will be appreciated from FIG. 2.

When the dry fly fishing lure of FIG. 1 rests upon the water surface, the weight of the lure causes the body 36 to slightly indent the water surface, but yet the water surface tension is not broken. Of course, only the lower region of the body 36 will be engaging the water, and the free strands 38, being disposed upwardly from the body will rest upon the water surface at a location vertically located higher than the bottom of body 36, and tend to aid in the orientation of the hook portion 24 in the vertical manner desired, as shown. When resting upon the water surface the lure will not be disposed in an exact horizontal manner in that the downwardly extending hackles 34 will rest upon the water surface and raise the eye end of the lure upwardly since the majority of the hackles engaging the water will not penetrate the water surface. The engagement of the free strands 38 with the water surface prevents the lure from tipping or rolling over, under normal conditions, as does the engagement of the hackles 34 with the water surface.

The elongated feathers or strands 40 and 42 are particularly helpful in orienting the lure to the vertical as the lure is cast through the air and descends toward the water. In that the feathers 40 and 42 are disposed well above the lure center of gravity, and due to the location of hackles 34 and strands 38 above the lure center of gravity, and the air resistance produced thereby, the lure will be properly vertically oriented prior to engaging the water surface, and because of the "keel" action of the lure, plus the advantages derived by the free strands 38, the body 36, and the hackle strands 34, the desired orientation of the lure on the water surface will be maintained.

Figure 2:
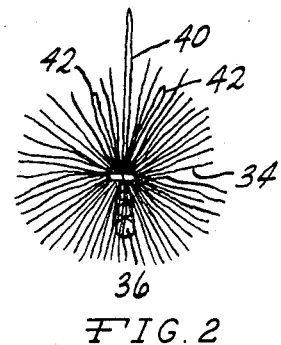
FIG. 2 is a front elevational view of the lure of FIG. 1, as taken from the left thereof.
Figure 3:
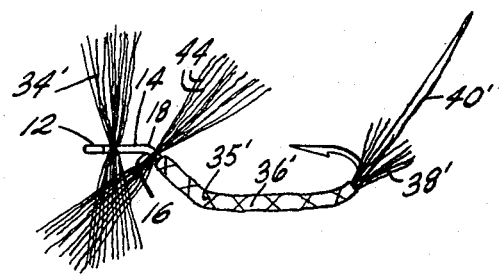
FIG. 3 is a side elevational view of the preferred embodiment of dry fly wherein two groups of hackles mounted upon the hook shank are angularly disposed relative to each other.

FIG. 3 illustrates a dry fly fishing lure similar to that shown in FIGS. 1 and 2 and identical components are indicated by primed numerals, except this embodiment is preferred over the previously described embodiment in that superior floatation characteristics are achieved by the utilization of a second group of hair-like strands or hackles 44 mounted upon the hook shank portion 16 adjacent the junction 18. As will be appreciated in FIG. 3, the flexible strands 44 radially extend from the portion 16 adjacent the junction 18 so as to be angularly disposed to and intersecting, the strands or hackles 34', identical to hackles 34 of the embodiment of FIG. 1. Thus, as the strands 44 are of sufficient length as to intersect the strands 34', the strands of both groups of hackles will intermingle, and as will be appreciated from FIG. 3, the length of the strands 44 extending downwardly are sufficient to extend below the projection of the length of the hook shank portion 20.

The embodiment of FIG. 3 produces superior floatation due to the presence of more water surface engaging strands or hackles than is possible with the embodiment of FIG. 1, and also because of the angular orientation of the strands 44 extending downwardly. Such angular orientation distributes the strands 44 over a relatively wide area of water surface and at an angle which resists penetration of the water surface and thereby produces superior support and floatation of the front end of the lure. Also, as the upwardly extending hackles 44 extend in the direction of sharp end 28 these hackles aid in protecting the lure against snagging.

Figure 4:
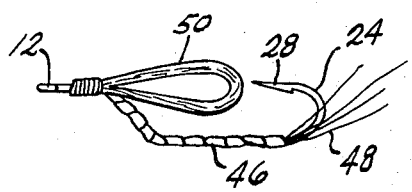
FIG. 4 is a side elevational view of another embodiment of fly fishing lure constructed in accord with the invention illustrating an emerging wing fly material and foil addition to the offset hook shank portions.
Figure 5:
FIG. 5 is a front elevational view of the lure of FIG. 4 taken from the left thereof.

FIG. 4 illustrates a wet fly fishing lure embodiment using fly material in the form of a foil 46 wrapped upon the hook portions 16 and 20, and thereby adding weight to the hook on those portions basically contributing to the "keel" action of the lure. The foil 46 is wound on both the hook portions 16 and 20 and flexible strands 48 extend rearwardly therefrom. The lightweight fly material 50 affixed to the shank portion 14 constitutes a "wing," two of such "wings" being tied to the shank portion 14 and extending toward the hook end 28. The wings 50 may be formed of feathers or the like folded back upon themselves as to form a loop. In that this type of lure is submerged during use, the presence of the lightweight wing disposed in substantial alignment with the projection of the shank portion 14, and hence above the center of gravity of the lure, readily permits the lure to "keel" and maintain the desired vertical orientation. The fly material foil 46 adds to the weight of the shank portions 16 and 20, and the free strands 48 function primarily to hide the hook portion 24 from view and contribute to the desired appearance of the lure.

Figure 6:
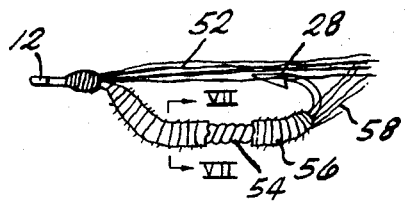
FIG. 6 is a side elevational view, partially sectioned, illustrating another embodiment of fly fishing lure of the wet type, particularly suitable for small lures.

The fly fishing lure embodiment illustrated in FIG. 6 is particularly desirable with very small lures of the wet type. In this embodiment the hook configuration is identical to that shown in FIG. 8, but of a small size, and flexible fly material strands 52, such as formed of hair, feathers, or the like are tied to the shank 14. The length of the fly material 52 is such as to extend to the sharp end 28 to protect the end for antisnagging purposes, and the resiliency of the strands is such as to deflect the lure from the path of snaggable objects, but will readily deflect from the hook sharp end upon the lure being taken by a fish.

Since, in a small lure, the ratio of weight distribution between the fly material 52, and the hook portions 16 and 20 is such as to reduce the effect of the "keel" action as compared with larger lures, it is desirable to add weight to the shank portions 16 and 20, and this may be achieved by winding a wire 54, such as of lead, about these shank portions, as illustrated. The wire 54 thereby significantly increases the weight of the hook below the projection of the shank portion 14 and the wire 54 may be camouflaged by wrapping hair or other fly material thereabout, as represented at 56 in FIGS. 6 and 7. Rather than winding the wire 54 about the hook portions 16 and 20 the wire may be tied to the hook portions or otherwise affixed thereto, and then covered by the fly material 56.

Preferably, the fly material 56 extends over the hook junction 26 and hair-like strands 58 extend from the material 56 disposed in an upward direction with respect to shank portion 20. Thus, the strands 58 will be located so as to contribute to the "keel" action since most of the length of strands 58 will be located above the lure center of gravity, as is the case with all of the fly material 52.

Figure 7:
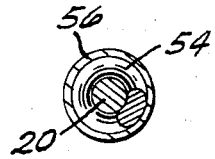
FIG. 7 is an elevational sectional view of the lure of FIG. 6 as taken along Section VII—VII thereof.

By adding the extra weight to the hook portions 16 and 20 the "keel" action of the lure of FIGS. 6 and 7 is augmented, and while the "keel" action of the lure without the addition of the wire 54 will exist, "tipping" of the lure while in the water is minimized as the weight of the lure well below the lightweight fly material 52 is increased.

With respect to the embodiments of FIGS. 1 through 5, it will be appreciated that the hackles 34, 34' and 44, and the wings 50 are all disposed intermediate the hook eye 12 and the sharp end 28 such that the hackles and wing function to protect the hook from snagging as the lure is pulled through the water. In the dry flies of FIGS. 1 through 3, although the hackle strands are not disposed immediately adjacent the sharp end 28, the antisnagging characteristics of the lure remain as any object which is likely to be snagged will pass adjacent the hackles and engagement with the hackles will deflect the lure from the path of such object. In all of the embodiments the addition of fly material to the hook portions 16 and 20, whether it be in the form of wrapped hair or strands, foil, wire, etc., will increase the weight of the hook at those portions thereof which provide the "keel" action and function, and thus the desired vertical orientation of the hook wherein the point 28 is above portion 20 will be augmented by the practice of the invention.

It is appreciated that various modifications to the disclosed embodiment may be apparent to those skilled in the art without departing from the spirit and scope thereof.

What is claimed is:

1. A fly fishing lure characterized by its ability to resist snagging and orient itself to the vertical comprising, in combination, a hook having a shank, an eye defined at an end of said shank, said shank including a first portion disposed adjacent said eye having a longitudinal length extending away from said eye, a second shank portion depending downwardly from said first portion and angularly disposed to said first portion and the length thereof, a third shank portion extending from said second portion in the general direction of the longitudinal length of said first portion and away from said eye, an arcuate hook portion extending from said third portion and curving upwardly toward the projection of the longitudinal length of said first portion including a sharp end extending toward said first shank portion and said eye, first lightweight fly material affixed to said first shank portion adjacent said eye, second fly material mounted upon said third shank portion and disposed about said third portion to substantially conform to the configuration of said third portion, the weight of said second and third portions and said second fly material being such as to locate the center of gravity of the lure below the projection of said first shank portion and below said first fly material whereby said second and third portions and said second fly material function as a keel to maintain said sharp end above said third portion, at least 50 percent of the total weight of the hook and said second fly material occurring on the side of an imaginary line drawn through said eye and a point one-half the shortest distance between said sharp end and said third portion remote from said sharp end.

2. In a fishing lure as in claim 1 wherein said second fly material is also mounted upon said second shank portion.

3. In a fly fishing lure as in claim 2 wherein said second fly material extends in a continuous manner from said third shank portion to said second shank portion and conforms in configuration to said second shank portion and the junction of said second and third portions.

4. In a dry fly fishing lure as in claim 1 wherein said second fly material comprises a plurality of lightweight flexible strands tightly wrapped together upon said third portion and upon the junction of said third and hook portions forming a dense body whereby the rear portion of said body of wrapped strands mounted upon the junction of said third and hook portions is disposed upwardly toward the projection of said first shank portion, and free strand ends extending from said body rear portion upwardly disposed toward the projection of said first shank portion whereby upon the lower region of said body resting upon and indenting the water surface said strand ends are located at a higher elevation on the water surface and maintain said hook portion sharp end disposed above said third shank portion.

5. In a dry fly fishing lure as in claim 4 wherein said free strand ends include at least one elongated strand of greater length than the majority of said free strand ends which extends upwardly substantially beyond said sharp end and aids in locating said sharp end above said third portion as the lure falls through the air toward the water.

6. In a dry fly fishing lure as in claim 5 wherein said elongated strand comprises feathers.

7. In a dry fly fishing lure as in claim 4 wherein said first fly material comprises a first group of hair-like strands radially extending from said first shank portion, the hair-like strands extending downwardly from said first portion extending below the projection of said third shank portion and adapted to engage the water surface to aid in the floatation of the lure.

8. In a dry fly fishing lure as in claim 7, a second group of hair-like strands mounted upon said second shank portion adjacent said first shank portion and radially extending from said second portion, the strands of said second group being angularly disposed to the strands of said first group and downwardly extending strands of said second group extending below the projection of said third shank portion and intermingling with the downwardly extending strands of said first group whereby the intermingling downwardly extending strands of said first and second groups aid in the floatation of the lure.

9. In a fly fishing lure as in claim 1 wherein said second fly material comprises a foil wrapped about said third and second shank portions.

10. In a fly fishing lure as claim 1 wherein said second fly material includes a wire weight mounted upon said third shank portion to increase the weight of said lure at said third shank portion.

11. In a fly fishing lure as in claim 10 wherein said first fly material comprises flexible strands extending toward said hook portion sharp end, and said second fly material includes a hair-like material wrapped about said third shank portion over said wire.

12. A dry fly fishing lure characterized by its ability to resist snagging and orient itself to the vertical comprising, in combination, a hook having a shank, an eye defined at an end of said shank, said shank including a first portion disposed adjacent said eye having a longitudinal length extending away from said eye, a second shank portion depending downwardly from said first portion and angularly disposed to said first portion and the length thereof, a third shank portion extending from said second portion in the general direction of the longitudinal length of said first portion and away from said eye, an arcuate hook portion extending from said third portion and curving upwardly toward the projection of the longitudinal length of said first portion including a sharp end extending toward said first shank portion and said eye, a first group of hair-like strands mounted upon said first shank portion and radially extending therefrom, the strands extending downwardly from said first portion extending below the projection of said third shank portion, a plurality of lightweight flexible strands tightly wrapped together upon said third shank portion and upon the junction of said third and hook portions forming a dense body whereby the rear portion of said body of wrapped strands mounted upon the junction of said third and hook portions is disposed obliquely upwardly toward the projection of said first shank portion, free strand ends extending from said body rear portion upwardly disposed toward the projection of said first shank portion, at least one half of the total weight of the lure being located below a line extending from said eye through the center of the bight of the arcuate hooked portion and sharp end whereby upon the lower region of said body of strands resting upon and indenting the water surface said free strand ends are located at a higher elevation on the water surface and aid in maintaining said hook portion sharp end disposed above said third shank portion and said first group of strands resist tipping of the lure.

13. In a dry fly fishing lure as in claim 11, a second group of hair-like strands mounted upon said second shank portion adjacent said first shank portion and radially extending from said second portion, the strands of said second group being angularly disposed to the strands of said first group and downwardly extending strands of said second group extending below the projection of said third shank portion and below said first shank portion and intermingling with the downwardly extending strands of said first group, whereby the intermingling downwardly extending strands of said first and second groups aid in the floatation of the lure.

14. In a dry fly fishing lure as in claim 11 wherein said free strand ends include elongated strands of greater length than the majority of said free strand ends which extend upwardly substantially beyond said sharp end and function to aid in locating said sharp end above said third portion as the lure falls through the air toward the water.

* * * * *